S. R. BECKWITH.
Granary, Fruit House, &c.
No. 53,101. Patented March 13, 1866.
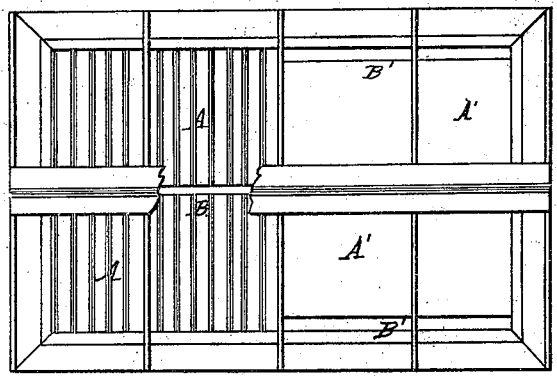
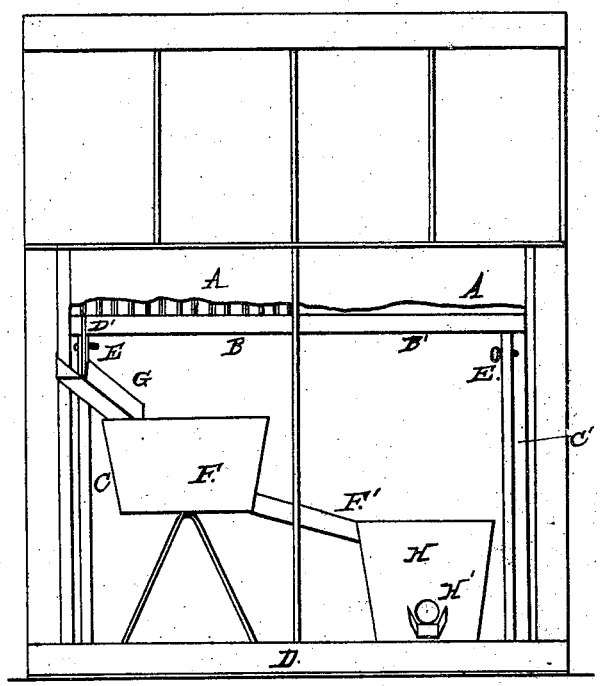
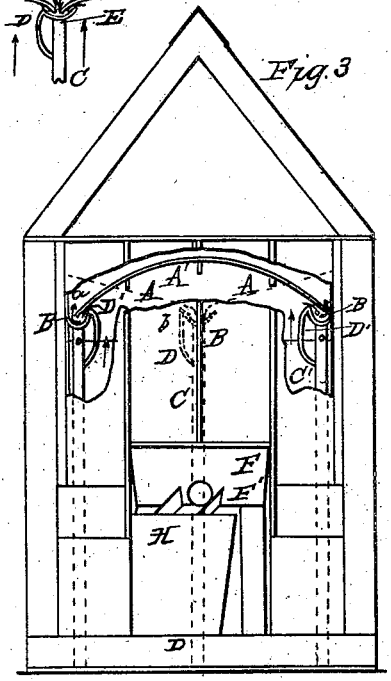
WITNESSES
W. H. Burridge.
Frank Alden.
INVENTOR
S. R. Beckwith

UNITED STATES PATENT OFFICE.

S. R. BECKWITH, OF CLEVELAND, OHIO.

IMPROVEMENT IN GRANARIES, FRUIT-HOUSES, &c.

Specification forming part of Letters Patent No. 53,101, dated March 13, 1866.

*To all whom it may concern:*

Be it known that I, S. R. BECKWITH, of Cleveland, in county of Cuyahoga and State of Ohio, have invented certain new and useful Improvements in Granaries, Fruit-Houses, &c.; and I do hereby declare that the following is a full and complete description of the same, reference being had to the accompanying drawings, making part of this specification, in which—

Figure 1 is a top view; Fig. 2, a side view; Fig. 3, an end view; and Fig. 4 is a detached section that will be referred to in the description.

Like letters of reference refer to like parts in the several views.

It is a well known fact that organic substances that fall easily into decay are precipitated into that condition by being surrounded with an atmosphere charged with obnoxious gases and moisture and having an elevated temperature; and hence the moisture and sulphureted and carbureted hydrogen always arising from the incipient stages of decomposition should be as speedily as possible removed from the immediate presence of the substance to be preserved; and it is the object of this invention to most effectually arrest the action of these decomposing agencies by providing means for conveying away the obnoxious gases and vapors, as well as to prevent their premature evolution, thereby arresting decay.

The building can be constructed in any manner suitable for this purpose, and of any desired dimensions and arrangement.

In the drawings, A A' represent metallic floors, the floor A being corrugated, and the floor A' curved or arched, as shown in Fig. 3; and the floors, whether corrugated, curved, or plane, may be made in sections and incline either to or from the walls, and when the sections meet, gutters, as hereinafter described, may be introduced for the purpose of receiving the condensed moisture from the under side of said floors and from the melting ice above, and forming air-tight water-joints when desired, and whereby air-tight rooms can be formed and ventilated at pleasure.

At the center and under the floor A is a trough, B, the edges of the floor projecting over and into said trough, as seen in Fig. 4, and indicated by the dotted lines $b$ in Fig. 3.

The floor A' has a trough, B', on each side, instead of one in the middle, like the floor A, the troughs B' being attached to the sides of the walls, the edges of this floor also projecting over into the troughs. From these troughs extend downward pipes C C', passing through the lower floor, D, to the ground, convey the water from the troughs. The ice-floors are made water-tight at their connection with the walls.

F represents a cooler into which the grain passes, being turned into the trough G from the cooler F, it passes through the chute F' into the cooler H and out through the spout H', when it is conveyed to any part of the building, or can be turned again into the trough G and pass through the coolers again; or, if desired, it can be kept in the coolers or bins, subject to the cooling influences of the ice above.

The ice is placed on the floors A A'. The floor A, having more surface than the other, being corrugated, as the ice melts the water will run down the floors into the troughs, filling them up as high as the water-line represented by the dotted lines $a$ in Figs. 3 and 4, and the moisture gathering on the under side of the floors will not drop as it would if the floors were level; but being inclined, as shown, or at a proper inclination, the water will run down the floors by adhesion into the troughs, to be conveyed away as required. In case the floor is not sufficiently inclined wooden troughs may be used to convey off the water, similar to my former patent.

The water cannot rise higher than the line $a$, Figs. 3 and 4, in the troughs, as the water-waste pipe D', with the trough, and uniting with the pipe below the cock, will convey it down into the main pipes C C', and thus keep the water in said troughs at a uniform depth, covering the ends of the floors. When the grain, fruit, &c., are first put into house there is an an excess of moisture and gas eliminated therefrom, which it is desired to drive off, so as to keep the room dry and free from foul air, and this is done by leaving the troughs empty and allowing the water from the melting of the ice and from moisture condensed on the under side of the floors to pass down through the pipes C C' and from these into the ground, and as the gas and vapor are allowed to pass up through the empty troughs, as indicated by the arrows in Figs. 3 and 4, into ice-chamber, and thus being absorbed or condensed by the ice, or escape from the house without changing materially the temperature of the room or rooms below. When the excess of gas and moisture has been passed off, and it is desired to have the room air-tight for the more perfect preservation of the fruit, grain, or meats stored, the faucet E is then turned, cutting off the passage through the main pipe, thus causing the troughs to be filled with water from the melting ice, and moisture condensed on the under side of the ice-floors running down into said troughs, which, when filled up by the water to the line $a$, as before set forth, forms an air-tight room between the lower floor, D, and the ice-floor above. By this means a room or rooms may be ventilated and made air-tight with ease and at any time.

The foul gases, hereinbefore referred to, being lighter than atmospheric air, will rise at any given temperature, while pure air at the same temperature will pass down from the ice-chamber above to take its place; or when the external atmosphere is sufficiently cool and dry, the supply of fresh air may be obtained from without at the lower portion of the room through proper openings, and if it is required to use any hygroscopic salt to increase the dryness of the rooms it may be done without conflicting with the described arrangements, and I design to apply the described improvement upon vessels and railroad-cars for the preservation of grain, fruit, &c., in transportation.

What I claim as my improvements, and desire to secure by Letters Patent, is—

1. Making the room or rooms for preserving grain, fruits, meats, &c, capable of being rendered air-tight by means of a water-joint and ventilating said room or rooms by opening said joint, substantially as and for the purposes set forth.

2. The combination of an ice-floor with a gutter or troughs, so as to form an open or tight joint, in the manner and for the purposes substantially as described.

3. The pipes C′ and D′, in combination with the cock E, gutters B, and an ice-floor, substantially as and for the purposes herein specified.

4. Preserving of grain, fruits, vegetables, &c., in a building whose upper floors are constructed, as set forth, for receiving ice, with the room or rooms below said floors capable of being made air-tight and ventilated into and above said floors, in the manner and for the purposes described.

S. R. BECKWITH.

Witnesses:
W. H. BURRIDGE,
E. E. WAITE.